Feb. 19, 1957　　H. W. WILLINGER ET AL　　2,782,161
AQUARIUM FILTER

Filed May 28, 1954　　3 Sheets-Sheet 3

INVENTOR.
HARDING W. WILLINGER
HERBERT N. NESTLER
BY Abraham Friedman

United States Patent Office 2,782,161
Patented Feb. 19, 1957

2,782,161
AQUARIUM FILTER

Harding W. Willinger and Herbert N. Nestler,
New York, N. Y.

Application May 28, 1954, Serial No. 432,965

4 Claims. (Cl. 210—16)

The present invention relates to a bottom aquarium filter.

The present invention relates more particularly to a device capable of aerating and filtering the water in an aquarium.

The pastime of cultivating fish in the home, especially tropical fish, is very popular. The aquariums that are normally used for this purpose are relatively small and the water is practically stationary and is not replaced except at intervals of time. Since the fish require air, it has been customary to bubble such air through the water, this requiring a pump of suitable character. There is also developed excretion from the fish and other foreign matter is likely to fall into the aquarium so that cleansing of the water is necessary. It is an object of the present invention to provide a device which may be disposed within an aquarium and which will eliminate the necessity for constantly changing the water in such aquarium, and which will make it possible for a larger number of fish to be placed in the aquarium, without adverse results, by cleaning the water and by supplying an adequate amount of oxygen.

It is a further object of the present invention to provide a device which will circulate the water in the aquarium and which will at the same time filter the water so that the water in the aquarium will be relatively clear and clean, and so that it will not be necessary to renew the water frequently.

It is a further object of the present invention to provide a device which need not be suspended on the walls of the aquarium, which is compact, efficient and easy to install.

The features of the invention will become readily apparent from the following description and from the accompanying drawings, in which.

Figure 1:
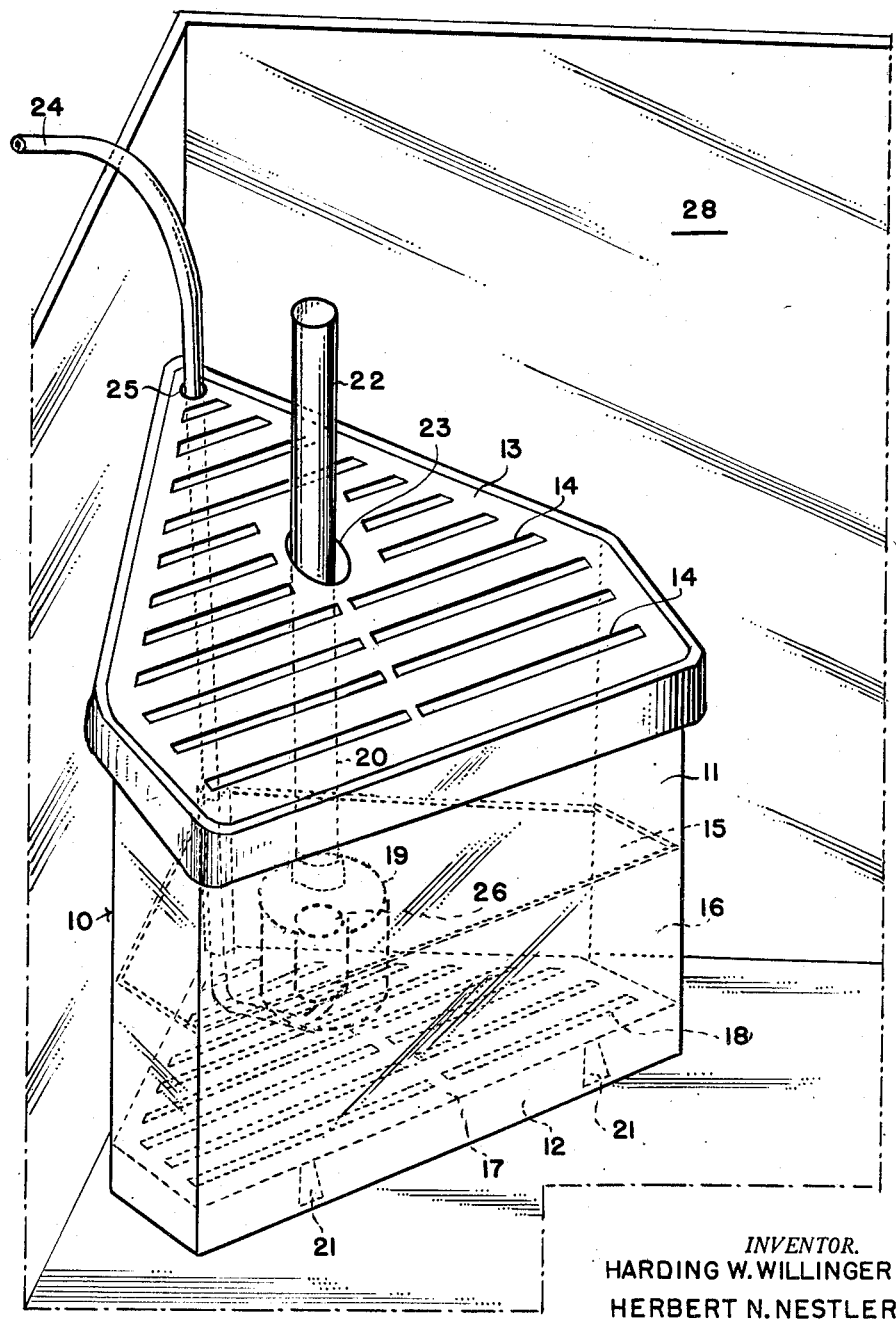
Figure 1 is a perspective view of an aquarium showing the device according to the invention located in one corner thereof.
Figure 2:
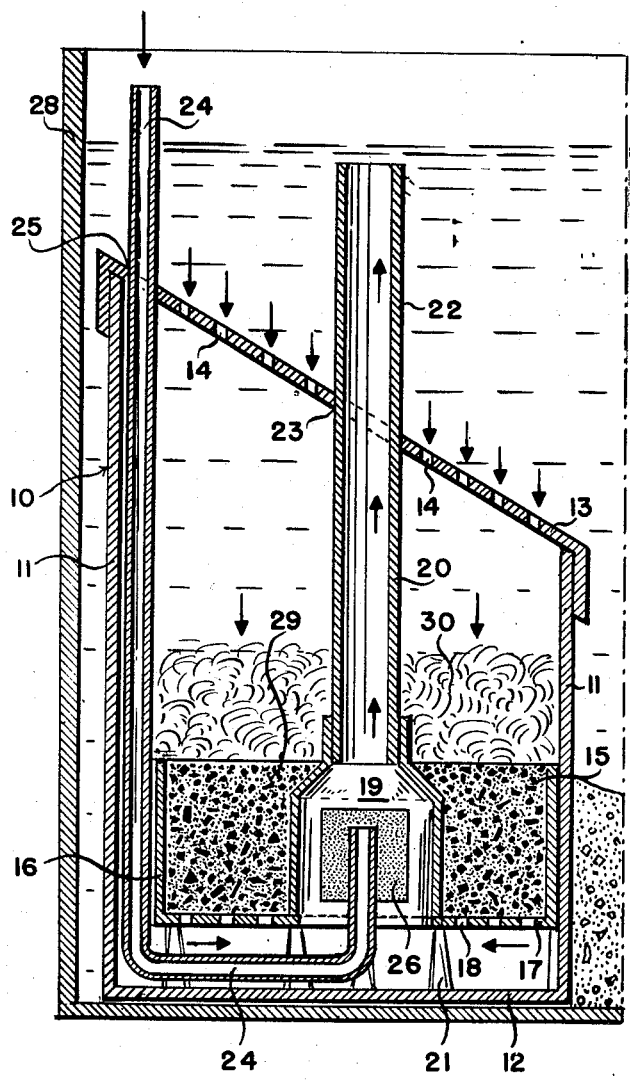
Figure 2 is a fragmentary sectional view through the tank and through the device according to the invention showing the interior construction thereof.
Figure 3:
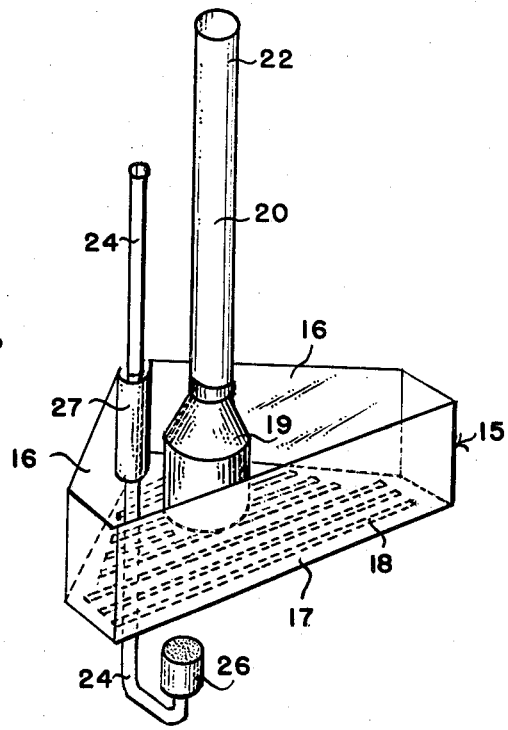
Figure 3 is a perspective view of the filter material receiving portion of the device showing the air delivery tube displaced from normal position for the purpose of clarity.
Figure 4:
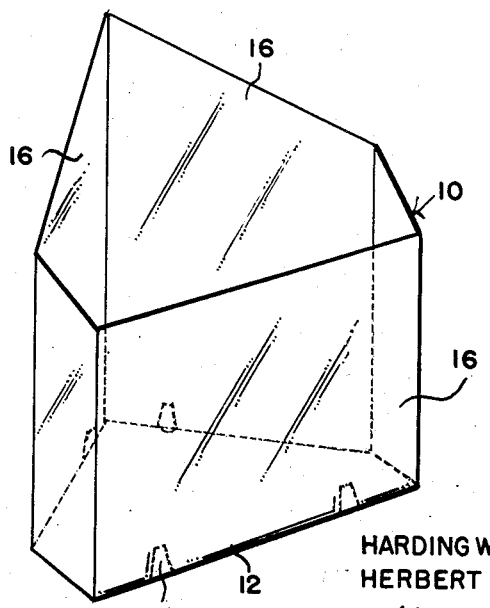
Figure 4 is a perspective view of the housing with the cover removed.

Referring now to the drawings, the device according to the invention comprises an enclosure or housing indicated generally by the reference numeral 10, said enclosure having side walls 11 and a bottom wall 12. The enclosure 10, as shown in Figures 1, 2 and 4, is generally triangular in shape in order that it may conveniently fit into one corner of an aquarium, one corner of which is indicated by the numeral 28.

The enclosure 10 is provided with a cover 13 having slots or openings 14 therein of a size to admit water and impurities but not fish in the tank. Disposed within housing 10 there is provided a triangular filter material containing chamber 15 having side walls 16, a bottom wall 17 having slots or perforations 18 therein, an upwardly extending funnel member 19 which extends from the inner ends of the bottom wall of the filter material receiving chamber 15 and is integral with a centrally located upright tube 20. The upper end 22 of tube 20 extends through an opening 23 formed in cover 13 of the housing.

Filter material receiving chamber 15 is supported in spaced position from the bottom 12 of the housing or enclosure 10 by any suitable means such for example as abutments 21 extending from the bottom wall 12. The important point is to have the bottom wall 17 of chamber 15 spaced from the bottom wall 12 of enclosure 10. The side walls 16 of said chamber fit snugly against the interior surface of the side walls of the housing.

Number 24 indicates an air delivery tube or conduit which receives air from a suitable air pump not shown and which extends into enclosure 10 through an opening 25 in cover 13, along one of the side walls 11, underneath bottom wall 17 of chamber 15, and into communication with an air dispersing cap 26. The chamber 15 is suitably shaped to permit the passage of air conduit 24 intermediate the chamber 15 and the walls 11 of the enclosure 10. For this purpose open sleeve 27 is provided at a juncture of side walls 16 of chamber 15 in order to accommodate air conduit 24, and to permit the passage of said tube below the bottom wall of the chamber. The lower end of air delivery tube 24 is provided with an air dispersing cap 26 which may be formed by a suitable porous material such as porous stone, which will cause the air passing therethrough from tube 24 to be broken up or dispersed before leaving said cap.

Air from a pump enters air conduit 24 and passes through the material of cap 26 and from there into the water filled space within the funnel member 19. The air leaving the cap 26, which air is broken up and dispersed, forms small bubbles which move upwardly through tube 20 thus causing movement of water within tube 20 in the direction of movement of such bubbles as indicated by the arrows within the tube in Figure 2. This causes water from the tank to be drawn into and enter the enclosure 10 through openings 14 in cover 13. Water which has entered the enclosure 10 is next drawn through the filter material receiving chamber 15 which has therein filter material such as glass wool 30 and charcoal 29 or other suitable filter media. The filtered water is drawn through openings 18 in the bottom wall 17 of chamber 15 and passes intermediate the air dispersing cap 26 and the inner walls of the funnel shaped member 19 and upwardly through tube 20. It will be noted that the enclosure 10 is positioned below the water level in the tank. The aerated and filtered water is passed out of the top end 22 of tube 20 into the main body of water in the tank. The unit according to the invention thus sets up a continuous circulation of water within an aquarium, drawing water through a filter, aerating such water, and returning such water, aerated and purified, to the main body of the tank as indicated by the arrows in Figure 2. It will be clear that the device according to the invention can readily be disassembled in order to clean and replace the filter material 29 and 30, the porous cap material 26 and in order to replace the air conduit 24 if necessary. The parts of the device can, of course, be made of attractive transparent plastic having a strength more than adequate for the purpose intended.

While the present invention has been described with reference to a specific preferred embodiment, it will be clear that various changes can readily be made by those skilled in the art without departing from the spirit and scope of the invention. It is accordingly intended that

What is claimed is:

1. In an aerating and filtering device adapted to be disposed below the water level in an aquarium, a generally triangular housing comprising an enclosure including a bottom and side walls and adapted to fit in a corner of the aquarium, a triangular filter material receiving chamber comprising an enclosure including side walls and a perforated bottom wall positioned in said housing, the side walls of said chamber abutting the inner surface of the side walls of said housing, the perforated bottom for said chamber extending inwardly and centrally from the side walls of said chamber and being spaced from the bottom wall of said housing, a funnel shaped member connected to the inner portions of the bottom wall of said chamber along the larger end thereof and open to the space intermediate said bottom walls, a tube connected to the smaller end of said funnel shaped member, said tube extending upwardly in said housing, a cover for said housing, said cover having perforations therein admitting water and impurities but not fish, said tube extending through an opening in said cover for said housing, filter material in said chamber, an air delivery means located in the space between the bottom walls of said housing and said chamber and extending within said funnel shaped member, air conduit means extending from said air delivering means to the exterior of the device, said air delivering means comprising means to break up and disperse air passing therethrough, whereby water entering said housing is drawn through said filter chamber into the space intermediate said bottom walls and caused to be returned to the aquarium through said funnel and tube under the influence of the air passing from the bottom portion of said housing through said funnel and tube.

2. The device according to claim 1 wherein the air delivering means comprises a porous body.

3. A device according to claim 1 wherein all said parts of the device are comprised of a transparent plastic material.

4. A device according to claim 1 wherein the top of said housing is provided with an opening therein for accommodating the air conduit means, the side walls of said chamber having an open sleeve accommodating said air conduit means, and said bottom wall of said chamber is provided with an opening therein conforming to said sleeve accommodating said air conduit means.

References Cited in the file of this patent
UNITED STATES PATENTS

| | | |
|---|---|---|
| 893,625 | Heuscher | July 21, 1908 |
| 2,636,473 | Schwartz et al. | Apr. 28, 1953 |
| 2,652,151 | Legus | Sept. 15, 1953 |
| 2,653,908 | Rodda | Sept. 29, 1953 |
| 2,665,250 | Willinger et al. | Jan. 5, 1954 |
| 2,676,921 | Vansteenkiste | Apr. 27, 1954 |